United States Patent [19]

Rampolla

[11] Patent Number: 4,796,263

[45] Date of Patent: Jan. 3, 1989

[54] FTIR OPTICAL MANIFOLD AND WAVELENGTH AGILE LASER SYSTEM

[75] Inventor: Robert W. Rampolla, Ellicott City, Md.

[73] Assignee: Westinghouse Electric Corp., Pittsburgh, Pa.

[21] Appl. No.: 106,205

[22] Filed: Dec. 21, 1979

[51] Int. Cl.[4] .......................... H01S 3/08; G02C 27/14
[52] U.S. Cl. ......................................... 372/10; 372/71; 372/97; 372/99; 372/23; 350/173
[58] Field of Search ...................... 330/4.3; 331/945 C, 331/945 M, 945 P, 945 Q; 350/172, 173, 485; 372/23, 108, 107, 97, 99

[56] References Cited

U.S. PATENT DOCUMENTS

| | | | |
|---|---|---|---|
| 2,997,922 | 8/1961 | Kaprelian | 350/173 |
| 3,398,379 | 8/1968 | Lewis et al. | 350/485 |
| 3,559,101 | 1/1971 | Parker et al. | 350/485 |
| 3,609,009 | 9/1971 | Laferman | 350/161 |
| 3,611,436 | 10/1971 | Rigrod | 350/172 |
| 3,711,791 | 1/1973 | Erichson | 331/94.5 Q |
| 3,716,804 | 2/1973 | Groschwity | 350/173 |
| 3,755,676 | 8/1973 | Kenal | 350/173 |
| 3,794,929 | 2/1974 | Corr | 331/94.5 P |
| 3,810,040 | 3/1974 | Martin et al. | 372/23 |
| 3,944,947 | 3/1976 | Pihe et al. | 330/4.3 |
| 3,986,130 | 10/1976 | Saures et al. | 330/4.3 |
| 4,060,769 | 11/1977 | Mallozzi et al. | 330/4.3 |
| 4,250,465 | 2/1981 | Leif | 372/23 |
| 4,293,827 | 10/1981 | McAlliste et al. | 331/94.5 C |
| 4,338,578 | 7/1982 | Suklimans | 372/23 |

FOREIGN PATENT DOCUMENTS 2059059  6/1971  Fed. Rep. of Germany ...... 350/173

OTHER PUBLICATIONS

Selleck et al., "Switches and Modulators Employing Frustrated Total Buterval Reflactors", 12/11/76, Intern. Conf. and Winter School on Submillimetes Waves and Their Application, 2d 1978, Puerto Rica.

Primary Examiner—Nelson Moskowitz
Attorney, Agent, or Firm—W. G. Sutcliff

[57] ABSTRACT

The invention relates to an optical manifold permitting a single pumping source to be utilized to selectively pump a plurality of laser sources. Switching of the emission from the pumping source to the laser source is accomplished by a plurality of FTIR switches. A second group of FTIR switches is utilized to switch the output beams of the laser sources to a common output path.

2 Claims, 6 Drawing Sheets

FTIR OPTICAL MANIFOLD AND WAVELENGTH AGILE LASER SYSTEM

GOVERNMENT CONTRACT

The invention described herein was made, in part, in the course of or under a contract from the United States Air Force, an agency of the United States Government, which has rights to this invention pursuant to Contract No. F33615-77-C-1268 awarded by USAF.

BACKGROUND OF THE INVENTION

1. Field of the Invention

The present invention relates to laser apparatus and methods. More specifically, it relates to switching systems and methods to provide a plurality of selectable low loss paths to, from, and within laser systems.

2. Description of the Prior Art

Some modern optical systems require the use of a single beam coherent light source, such as a laser beam, capable of rapid, efficient, and reliable switching from one wavelength to another. Typically, selectable wavelength beams have been generated by systems comprising multiple laser sources, whose emission beams are selectively directed to a common output path. Alternatively, a plurality of specific wavelengths can be produced from a single laser source, such as Krypton gas, for example.

A very large wavelength range can be achieved when organic dyes dissolved in solvents are used as the laser sources. Typically, each source is pretuned to a fixed wavelength, and excited (pumped) when that wavelength is desired. For dye laser sources, the pumping source is generally other optical emissions such as a flash lamp or another laser source.

Fortunately, the pump emission requirements for many dye laser source are similar and may be the same source, reducing the pump source requirement to only one laser, which is sequentially switched to pump the desired dye laser source. However, this switching of the pump emission to one of several particular dye laser sources (to produce the specific wavelength desired) has traditionally been the 'weak link', imposing limitations on wavelength switching speed, efficiency, and reliability of the switched wavelength laser systems. In addition, a similar problem occurs in switching the paths of emission of each dye laser source to a common output path, when the laser source emissions are sufficiently close in wavelength, to preclude the use of special wavelength selective mirrors.

A simple mechanical device, such as a moving or rotating mirror arrangement may also be used to direct a single pump source to the desired laser source. However, these systems are difficult to operate at high switching rates and may have reliability problems.

A beam deflector utilizing the Bragg effect is described in U.S. Pat. No. 3,609,009, wherein two Bragg angles are formed symmetrically about the incident source light path in a medium by externally induced acoustic waves. This technique is limited by incomplete and multiple mode diffraction, resulting in a loss in transmission, variable diffraction angles, and delays due to the propagation of acoustic waves in the optical media.

Another apparatus is shown in U.S. Pat. No. 3,755,676 wherein gratings forming filters of specific spatial frequency are imposed in the path of spatial frequency multiplexed coherent emission to select out a specific signal. Path selection is accomplished by altering the spatial repetition rates of the gratings or moving the spatial dimensions of the filters. Both of these techniques are relatively slow and complex.

Light beam gating by a Frustrated Total Internal Reflector (FTIR) device has been taught in U.S. Pat. No. 2,997,922. The approach to beam gating is to physically move the media objects toward or apart from each other by mechanical or electromechanical means. The majority of the prior art required considerable energy to operate an FTIR switch between 100% reflectivity and 100% transmission. Similarly, in U.S. Pat. No. 3,711,791, a frustrated total internal reflection (FTIR) switch is used as a Q switch, with incident laser emission either transmitted through a single output path, or reflected back to the laser source.

SUMMARY OF THE INVENTION

Broadly, the present invention relates to a system and method of generating a single, frequency agile, laser beam. Such system and method utilizes a plurality of optical switches to switch different laser sources into path of a common laser pump source and switch the laser source emission into a common output path.

More specifically, the present invention provides the plurality of paths necessary by a geometric arrangement of two-position optical switches, having two paths sharing a common terminus. The common terminus can be either the input or the output light path. The optical switches are analogous to electrical double-throw single pole switches. The optical switches are cascaded to increase the number of optical paths available until the number of paths is equal the number of different frequency laser emissions desired.

Optically pumped laser sources, typically dye laser sources, are each tuned to different wavelengths (frequencies) and placed in line with different optical paths. Optical pump energy is directed through a selected laser source by the proper selection of optical switch positions. When the desired path is established, the optical pump energy is energized to produce an optical energy beam which is directed through the selected laser source causing the source to emit the desired wavelength. Thereafter, if the wavelengths are sufficiently different, frequency selective mirrors are used to recombine the multiple paths of the laser source emissions into a common output path. In cases where the laser source emissions are too close in wavelength to use frequency selective mirrors efficiently, a similar but sequentially inverted arrangement of optical switches are used to recombine the laser source emission paths into a common output path.

Each optical switch is a Frustrated Total Internal Reflection (FTIR) switch, whose basic operation typically comprises moving two optically transmissive crystals from a position of contact to approximately one wavelength spacing. The effect of this FTIR switch on a light beam incident to the facing surfaces of the crystals at a significant angle is to change from transmission through both crystals to internal reflection within the crystal initially receiving the light beam as the spacing between the crystals increases.

The movement necessary for the proper operation of the FTIR switch with pulsed light sources may be provided by attachment of a piezoelectric transducer on each of the two crystals to receive a single electrical pulse to produce a shock wave to move the crystals with a single force. An alternate way of energizing the transducers according to the present invention is to provide a periodic excitation signal at the resonance of the crystal, wherein the motion of the crystals is gradually increased to the desired excursion. According to the present invention, when the quiescent spacing of the crystals is a large portion of a wavelength and the excitation signal is of a proper amplitude and frequency, reflections greater than 98% and transmissions of greater than 98% efficiency are attainable.

Additionally, a group of optical switches may be used without the optical pump and laser source components of the laser system to provide an optical manifold producing a rapidly switched plurality of optical paths, wherein a single input beam is switched among a plurality of optical output paths. Such a device may find application in laser and other optical systems.

DESCRIPTION OF THE PREFERRED EMBODIMENT

The system and method of the present invention provides a simple, efficient, and reliable laser system for selectively generating a plurality of dye laser output beams, each having a different wavelength, stimulated by a single pump laser source, and directing the output beam of each of the laser sources through a single, common aperture.

Figure 1:
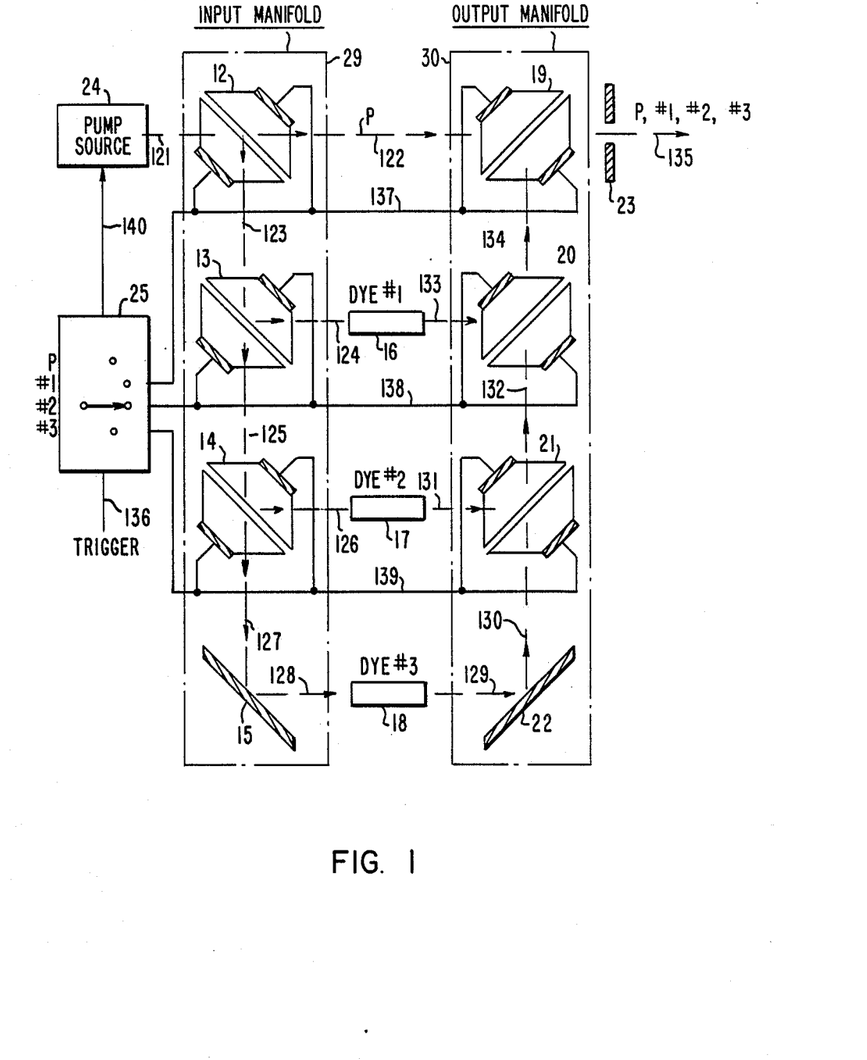
FIG. 1 shows an optical laser system configuration according to one embodiment of the present invention.

Referring to the drawings, and in particular to FIG. 1, the concept of an FTIR optical manifold 29 suitable for selectively switching a laser 121, used as a pump source, into any one of a multiplicity of coaxially pumped laser dye cells 16, 17, 18; also shown is the FTIR manifold 30 for translating selectively individual laser source output beam 133, 131, 129 to a common exit port 23.

The FTIR switch elements 12, 13, 14, 19, 20, 21 are characterized by a time varying reflectivity (R) and transmission (T) where $R+T \approx 1$. The exact form of the time variation of R and T is a function of the acousto-mechanical characteristics of the piezoelectric transducers, the energizing wave form applied thereto and the acousto-mechanical characteristics of the FTIR prism elements. In the description of the preferred embodiment below, $R_{max}$ will be used to denote an FTIR switch condition of maximum (or near maximum) internal reflection ($R \geq 98\%$) and $T_{max}$ will be used to denote a condition of maximum (or near maximum) transmission ($T \geq 98\%$).

If pulsed laser sources are employed as part of this invention, and in particular if a Q-switched laser pump is used to energize a plurality of dye lasers within the optical manifold, then the occurrence of $R_{max}$ and $T_{max}$ in the separate FTIR switches is made to coincide with the time of occurrence of the laser pump pulse and the concurrent dye laser pulse in order to have a single specified beam appear at the exit aperture. The conditions of $R_{max}$ in certain FTIR switches and $T_{max}$ in other FTIR switches are made to occur simultaneously with each other by adjusting the phasing of the energizing wave form applied to the appropriate piezoelectric transducer.

An alternate mode of operation is also possible whereby more than one dye laser can be pumped simultaneously by suitable adjusting of the time of occurrence of the pump pulse to coincide with a partially reflecting-partially transmitting condition of the input manifold FTIR switches. The multiplicity of dye laser beams resulting from this mode of operation can be made to appear at a common exit aperture by employing the optical manifold embodiment shown in FIG. 3. The conditions of $R=R_{max}$ in certain FTIR switches and $T=T_{max}$ in other FTIR switches are made to occur simultaneously with each other by adjusting the phasing and amplitude of the energizing wave form applied to the appropriate piezoelectric transducers.

The table shown below gives the FTIR switch conditions required to have a specified beam appear at the exit aperture 23, for the optical configuration of FIG. 1.

| Output Beam (135) | Switch | | | | | |
|---|---|---|---|---|---|---|
| | 12 | 13 | 14 | 19 | 20 | 21 |
| 122 (pump) | $T_{max}$ | X | X | $T_{max}$ | X | X |
| 133 (dye #1) | $R_{max}$ | $R_{max}$ | X | X | $R_{max}$ | $R_{max}$ |
| 131 (dye #2) | $R_{max}$ | $T_{max}$ | $R_{max}$ | $R_{max}$ | $T_{max}$ | $R_{max}$ |
| 129 (dye #3) | $R_{max}$ | $T_{max}$ | $T_{max}$ | $R_{max}$ | $T_{max}$ | $R_{max}$ |

$T_{max}$ = maximum transmission
$R_{max}$ = maximum reflection
X = don't care

The system is activated by trigger signal which enters the energizing means 25 via a signal path 136 wherein a particular wavelength (path) is selected. When the path is established, a pump signal initiates pump 24 excitation via path 140. The pump laser beam 121, FIG. 1 is provided as an output at aperture 23 by energizing FTIR's, 12 and 19 to $T_{max}$ to allow transmission on a substantially straight line 122 from input 121 to output 135.

Dye laser source 16 is pumped when FTIR switches 12 and 13 are energized to $R_{max}$ thereby directing the pump beam 121 from pump source 24 along the low loss path 121, 123, 124 into dye laser 16. Similarly, the output beam 133 of dye laser 16 is switched to output path 135 by energizing FTIR's 19 and 20 to $R_{max}$ thereby providing a low loss path 133, 134 to 135.

Dye laser source 17 is pumped when FTIR switches 12 and 14 are energized to $R_{max}$ and FTIR switch 13 is energized to $T_{max}$ thereby directing the pump beam 121, 123, 125, 126 into dye laser 17. The output beam 131 of dye laser 17 is switched to output path 135 by energizing FTIR's 21 and 19 to $R_{max}$ and FTIR 20 to $T_{max}$ thereby providing a low loss path 131, 132, 134 and 135.

Finally, dye laser source 18 is pumped when FTIR switch 12 is energized to $R_{max}$ and FTIR switches 13 and 14 are energized to $T_{max}$ thereby directing the pump beam 121 from pump source 24 along the low loss path 121, 123, 125, 127, 128 into dye laser 18. The output beam 129 of dye laser 18 is switched to output path 135 by energizing FTIR's 21 and 20 to $T_{max}$ and FTIR 19 to $R_{max}$ thereby providing a low loss path 129, 130, 132, 134 to 135.

Figure 2:
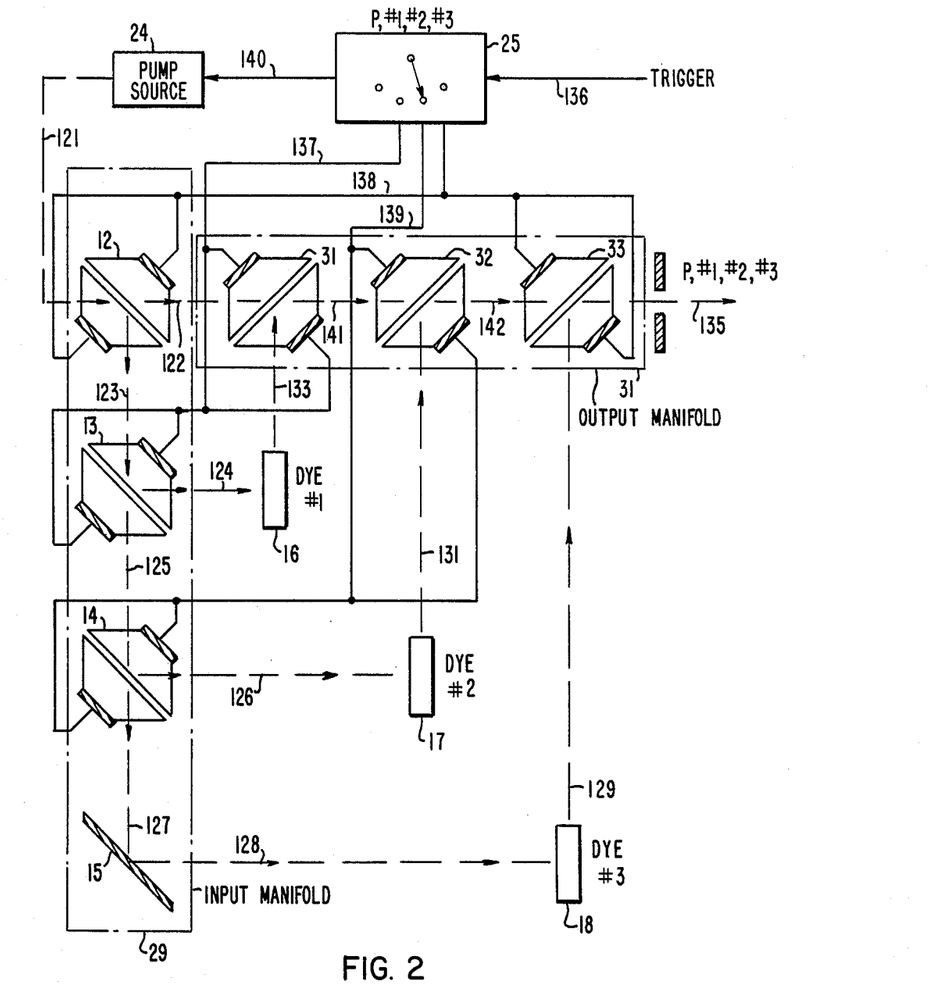
FIG. 2 shows an alternate optical laser system configuration according to the present invention.

In FIG. 2, an alternate laser system configuration of the laser system comprising the present invention. Multiple transverse dye cell pumping is achieved through the geometrical arrangement of the FTIR switch elements shown. The corresponding FTIR switch conditions required to have a single specified beam appear at the exit aperture 30 are given below:

| Output | Switch | | | | | |
|---|---|---|---|---|---|---|
| Beam (135) | 12 | 13 | 14 | 31 | 32 | 33 |
| 122 (pump) | $T_{max}$ | X | X | $T_{max}$ | $T_{max}$ | $T_{max}$ |
| 133 (dye #1) | $R_{max}$ | $R_{max}$ | X | $R_{max}$ | $T_{max}$ | $T_{max}$ |
| 131 (dye #2) | $R_{max}$ | $T_{max}$ | $R_{max}$ | X | $R_{max}$ | $T_{max}$ |
| 129 (dye #3) | $R_{max}$ | $T_{max}$ | $T_{max}$ | X | X | $R_{max}$ |

$T_{max}$ = maximum transmission
$R_{max}$ = maximum reflection
X = don't care

The pump laser source 24 is provided as an output at aperture 23 by energizing transducers on FTIR switches 12, 31, 32 and 33 to $T_{max}$, allowing transmission through these switches thereby providing an output beam 135 along a substantially straight line along paths 121, 122, 141, 142 to 135 from source 24.

Dye laser source 16 is pumped when FTIR switches 12 and 13 are energized to $R_{max}$ allowing pump beam 121 from pump source 24 to be reflected by both of these switches along paths 123, 124 into dye laser 16. The output beam 133 of dye laser 16 is switched to the output path 135 by energizing FTIR switch 31 to $R_{max}$ and FTIR switches 32 and 33 to $T_{max}$ thereby providing a low loss path 133, 141, 142 to 135.

Dye laser source 17 is pumped when FTIR switches 12 and 14 are energized to $R_{max}$ and FTIR switch 13 is energized to $T_{max}$ allowing pump beam 121 from pump source 24 to be reflected by switch 12, transmitted by switch 13 and reflected by switch 14 along paths 121, 123, 125, 126 into dye laser 17. The output beam 131 of dye laser 17 is switched to the output path 135 by energizing FTIR switch 32 to $R_{max}$ and FTIR switch 33 to $T_{max}$ thereby providing a low loss path 131, 142 to 135.

Dye laser source 18 is pumped when FTIR switch 12 is energized to $R_{max}$ and FTIR switches 13 and 14 are energized to $T_{max}$ allowing the pump beam 121 from pump source 24 to be reflected by switch 12, transmitted by switches 13 and 14 and reflected by mirror 15 along path 121, 123, 125, 127, 128 into dye laser 18. The output beam 129 of dye laser 18 is switched to the output path 135 by energizing FTIR switch 33 to $R_{max}$ thereby providing a low loss path 129 to 135.

Figure 3:
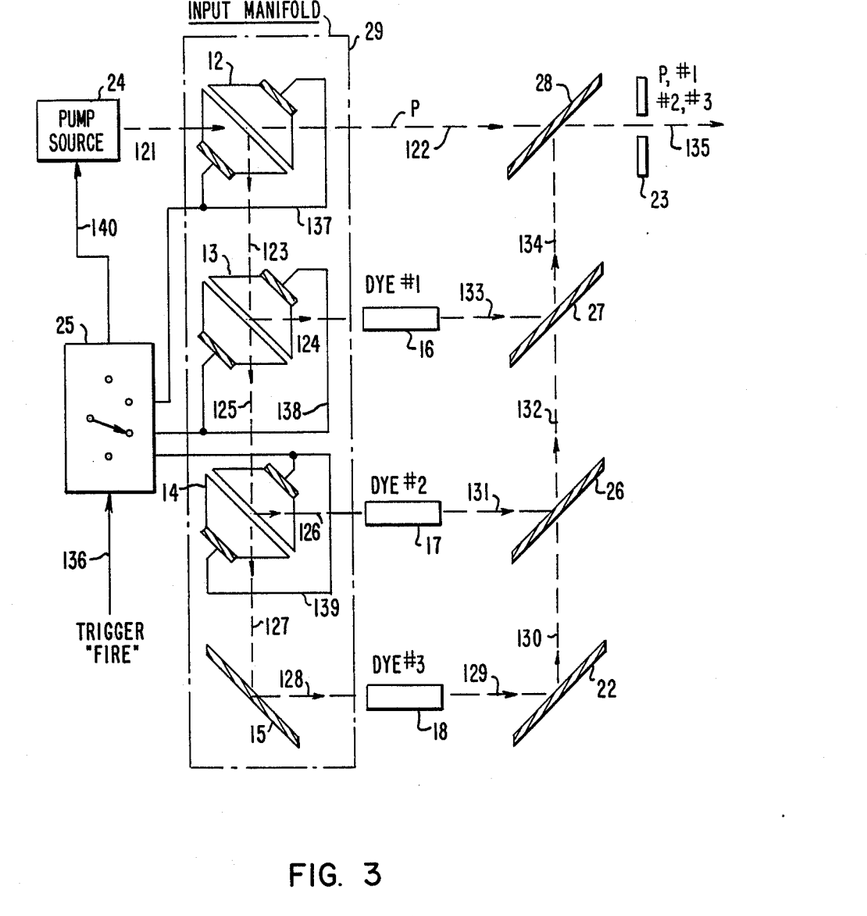
FIG. 3 shows an alternate optical laser system according to the present invention.

FIG. 3 shows another embodiment of the present invention utilizing frequency selective (dielectric) mirrors 26, 27, 28 as elements of the laser system. The wavelengths of the particular dyes laser sources are sufficiently separated so that no output emissions are lost in the frequency selective mirrors, where they are either completely transmitting or reflecting.

Trigger signal 136 enters the energizing means 24 wherein a particular laser wavelength (path) is selected. When the path is established, pump signal initiates the pump source 24 along path 140.

The pump laser beam 121 is provided as an output at aperture 23 by energizing FTIR switch 12 to $T_{max}$ thereby allowing transmission through switch 12 and through frequency selection mirror 28, which is not reflective at the pump wavelength, along path 121, 122 to 135.

Dye laser source 16 is pumped when FTIR switches 12 and 13 are energized to $R_{max}$ thereby directing the pump beam 121 from pump source 24 along the low loss path 121, 123, 124 into dye laser 16. The laser emission 133 from dye laser source 16 is directed by frequency selective mirrors 27, 28, both of which are reflective at the emission wavelength of dye laser source 16, along path 133, 134 to output path 135.

Dye laser source 17 is pumped when FTIR switches 12 and 14 are energized to $R_{max}$ and FTIR switch 13 is energized to $T_{max}$ thereby directing the pump beam 121 from laser source 24 along the low loss path 121, 123, 125, 126 into dye laser 17. The emission of laser source 17 is reflected by frequency selective mirror 26, transmitted through frequency selective mirror 27 and reflected by frequency selective mirror 28 to transmit the beam along paths 131, 132, 138 to output path 135.

Dye laser source 18 is pumped when FTIR switch is energized to $R_{max}$ and FTIR switches 13 and 14 are energized to $T_{max}$ thereby directing the pump beam 121 from laser source 24 along the low loss path 121, 123, 125, 127 to mirror 15 where it is reflected along path 128 to dye laser 18. The emission 129 of dye laser 18 is reflected by mirror 22 along path 130 through two frequency selective mirrors 26, 27 along path 132, 134 and finally reflected by frequency selective mirror 28 along path 135.

Figure 4:
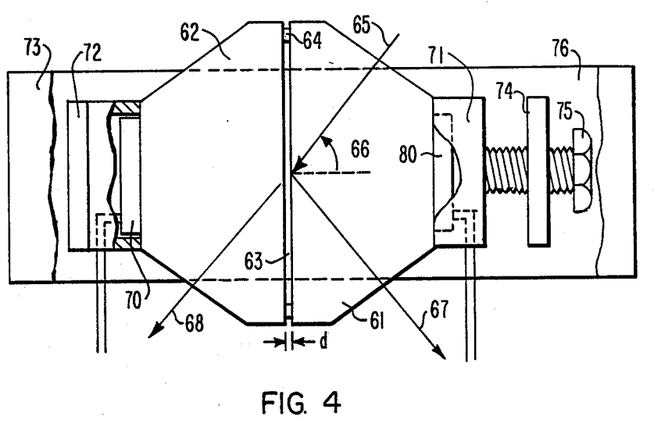
FIG. 4 shows a top cut-away view of an FTIR switch as used in the system according to one embodiment of the present invention.

A more detailed view of each FTIR switch is seen in FIG. 4. The FTIR switch operates by the phenomenon wherein the path through two consecutive transmissive surfaces with an interposed space of differing optical refraction index, will exhibit varying transmissivity from substantially complete transmission of light to substantially complete reflection of light, as a function of the difference in refraction index, wavelength of light, and spacing. The structure illustrated allows the transmission of light along path 68 and the reflection path 67 when the light is incident along a path 65. The FTIR comprises two crystals 61, 62 separated by a spacing 63. Typically, spacing 63 is thicker than necessary, but compressed to the proper thickness by force applied by compression springs 72, 74. Compression springs 72 and 74 are attached to a support structure comprising base member 76, top member 73. Transducer supports 71 and 72 support transducers 70 and 80. The crystals 61 and 62, transducers 70 and 80, and spacer 64 are held in compression between springs 72 and 74 by a pressure adjusting screw 75.

Figure 5:
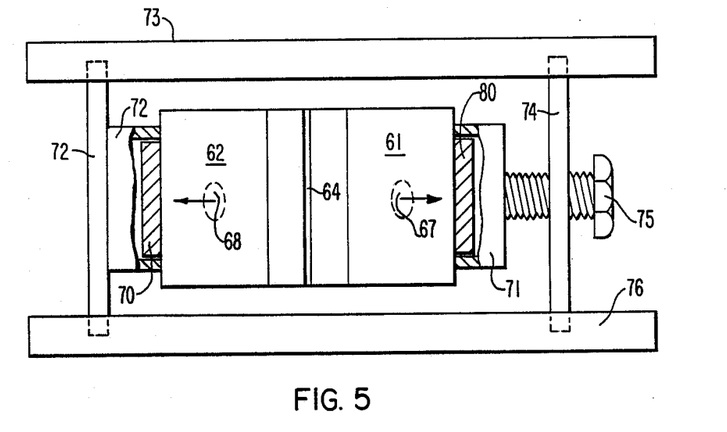
FIG. 5 shows a side view of an FTIR switch as used in the system according to the present invention.

Crystals 61, 62 are any suitable media for desired laser emission wavelength, as in this embodiment, fused silica. The space 63 may be gas filled or evacuated, as long as the index of refraction is different from the crystals 61, 62. Spacer 64 may be a separate structure. Alternatively, it may be a deposition on the surface of one or both of crystal 61 and 62. FIG. 5 shows a side view of the same FTIR switch as in FIG. 4.

Figure 6:
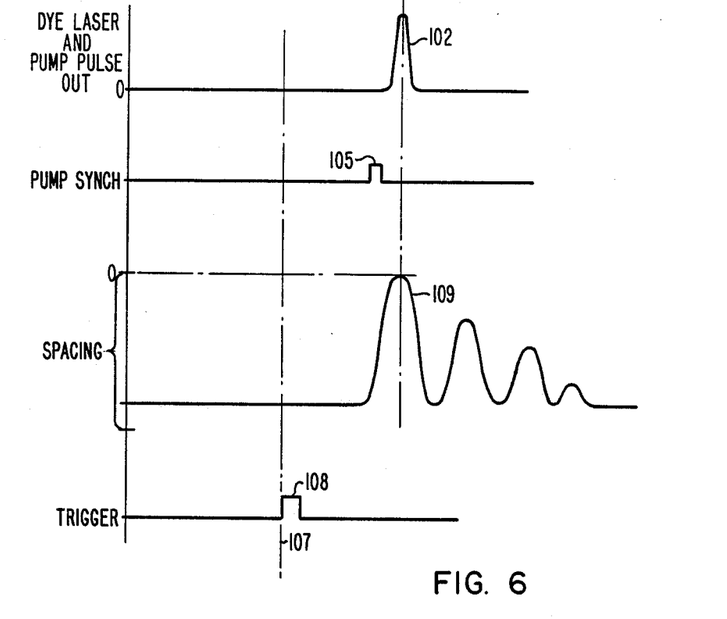
FIG. 6 is a graph illustrating the timing of the gap variation with respect to the pump source in the operation of the laser system according to the present invention.
Figure 7:
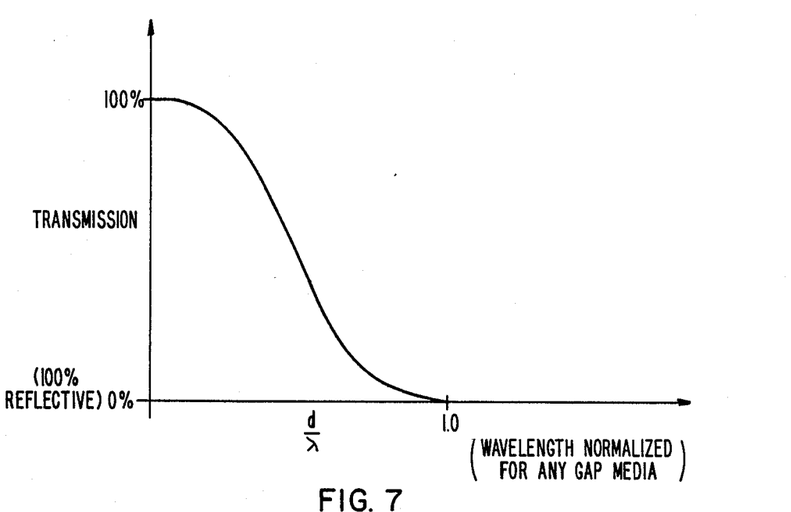
FIG. 7 is a graph to illustrate the relationship between the variation of the space between the crystals to transmission/reflection characteristics in typical operation of the present invention.

When the method of exciting the transducers 70 comprises a single pulse of energy to produce the desired variation, in the thickness of spacing 63, pressure screw 75 is initially adjusted so that spacing 63 has a thickness less than a wavelength of the emission used. To switch to the transmission mode, a pulse of energy is applied to the transducers 70 and 80, to drive the crystals 61, 62 closer together. A trigger pulse, 108, FIG. 6 applied to the transducer at point in time illustrated at reference numeral 107 causes a strong acoustic wave to propagate from the transducer, into the crystals 61 and 62. Depending on the polarity, the acoustic wave is either compressional or expansional. If a compressional wave is produced, as preferred due to greater efficiency, the wave propagates to the opposite surfaces of the crystals 60 and 61 which form the boundaries with the spacing 63. This causes the spacing between the crystals to change to switch the FTIR switch to the transmitting mode as illustrated at reference numeral 109. The pump source is initiated by signal pulse 105 to produce an output signal synchronous with the FTIR switch as illustrated at reference numerals 102 and 105.

Typical FTIR switches have a resonant frequency. This results in the ringing illustrated in FIG. 6.

Figure 8:
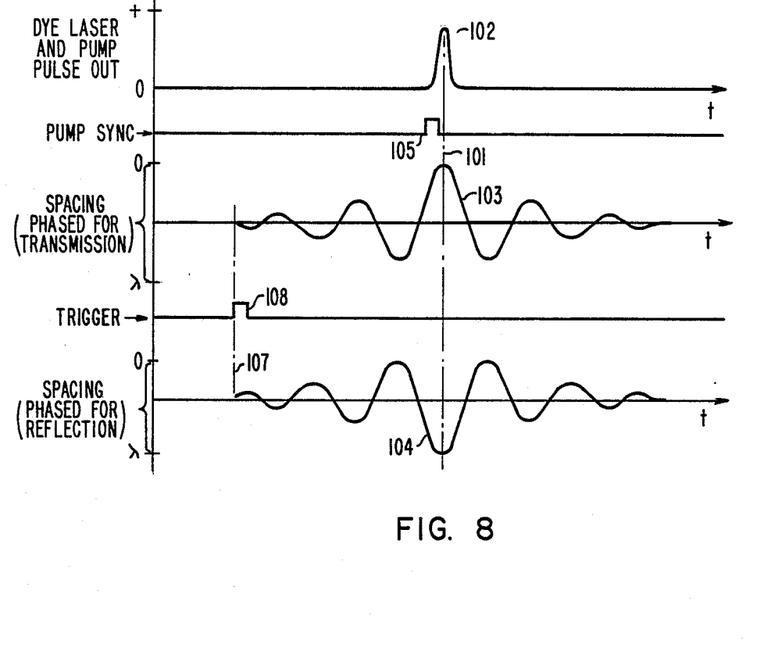
FIG. 8 is a graph illustrating the phasing of the gap with respect to the pump source to produce either the transmission or reflection mode in typical operation of the present invention.

A preferred method of driving the FTIR switches is to apply a selected number of cycles of signal of a particular amplitude, phase, and frequency to all FTIR switches in the optical path. The amplitude and number of cycles is typically the same for all FTIR switches, wherein the amplitude is limited by the maximum tolerated by the transducer for reliable operation, and the number of cycles is determined by the space variation necessary for the desired percent transmission or reflection. The frequency is determined by the resonance, characteristic of the FTIR switch. Generally, only two phase angles are used; zero degrees, or inphase, and 180°, or out of phase, depending on whether transmission or reflection of that particular FTIR switch is desired. If a continuous emission is used, the FTIR switch will produce alternately and varying transmitting and reflecting characteristics at the rate of the excitation frequency, typically 100 kHz. Therefore, the means to effect a change from transmitting or reflecting state comprise a source of periodically varying, synchronizable voltage of sufficient amplitude and duration to drive the necessary FTIR switches, wherein the phase of the periodically varying signal may be rapidly changed from an inphase to an out-of-phase state as illustrated in FIG. 8 at reference numerals 103 and 104. When the phase is changed, a few cycles are needed to allow the FTIR to respond and stabilize. When the FTIR switches have stabilized, a pump signal to the pump source is properly timed to coincide with the phase of the FTIR switch excitation. The particular electronic circuits used in implementation are well known to those skilled in the art.

A more exact relation of reflection to emission wavelength and spacing is discussed by Court et al. in a publication entitled "Frustrated Total Laser Cavity Design," Applied Optics, Vol. 3, pp. 719-726, June 1964.

These and other arrangements are possible, with dye and other optically pumped lasers, and with non-optically first pumped lasers using the last output manifold alone.

According to the present invention wherein resonant excitation of a crystal is used, transducers 70, FIG. 5, are affixed to a surface of the crystals 61, 62 without compression loading; in practice, proper operation of the FTIR switch has been demonstrated using the above transducer mounting.

The synchronizing of the FTIR switches with each other and the pump source is shown in FIG. 8, wherein the trigger signal 108 begins the firing cycle. After sufficient time 101, the switch is in proper position to transmit 103 or to reflect 104 the dye laser or pump pulse energy. The pump is triggered 102, producing energy to coincide with minimum 103 or maximum 104 gap spacing.

What is claimed is:

1. An optically pumped frequency agile laser system comprising:
   (a) a source of optical energy for producing a first laser beam;
   (b) a plurality of laser sources sequentially designated, 1 through n;
   (c) a first optical manifold including a plurality of FTIR switches sequentially designated 1 through m wherein:
      (1) said first laser beam is selectively switched by said first FTIR switch between the output port of said laser system and the input of the second (m=2) of said FTIR switch;
      (2) said second (m=2) and subsequent FTIR switch through number (m−1) switching said first laser beam between the input to the next higher order FTIR switch and a selected laser with switch (m) switching said laser beam between laser source (n−1) and laser source (n);
   (d) a second optical manifold comprising a plurality of FTIR switches designated 1 through k
      (1) the first (k=1) of said plurality of optical switches receiving as inputs said first laser beam and the output beam of one of said n laser sources and selectively coupling one of these inputs to the output port of said laser system;
      (2) said second (k=2) and subsequent switches receiving as inputs the output beam of laser (n=1) and the output beam of laser source where n≧k and selectively coupling these input signals to the output port of said laser system;
   (e) control means for controlling the state of said switches to produce said frequency agile output signal.

2. An optically pumped frequency agile laser system comprising:
   (a) a source for producing a first laser beam;
   (b) a plurality of laser sources sequentially designed, 1 through n;
   (c) a first optical manifold including a plurality of FTIR switches sequentially designated, 1 through m, wherein:
      (1) said first laser beam is selectively switched by said first FTIR switch (m=1) between the output port of said frequency agile laser system and the input of the second (m=2) of said FTIR switches;
      (2) said second (m=2) and sequentially subsequently FTIR switches through switch number (m−1) switching said first laser beam between the input to the next higher order switch and to impinge on and optically pump a selected one of said laser sources with switch (m) switching said first laser beam to optically pump laser source (n−1) and laser source n where the maximum value of m is equal to the maximum value of n;
   (d) a second optical manifold including:

(1) means for combining the output laser beams of laser sources 1 through n to form a composite laser beam;
(2) means for selectively coupling said first laser beam and said composite laser beam to the output port of said laser system;
(e) means for generating signals to control said FTIR switches to produce a frequency agile laser beam at the output port of said laser system.

* * * * *